US005918515A

United States Patent [19]
Hinson

[11] Patent Number: 5,918,515
[45] Date of Patent: Jul. 6, 1999

[54] LATHE REFERENCE STOP AND COMBINATION TOOL

[76] Inventor: Ronald L. Hinson, 104 17th Ln., Piedmont, S.C. 29673

[21] Appl. No.: 08/947,585

[22] Filed: Oct. 9, 1997

Related U.S. Application Data

[60] Provisional application No. 60/028,247, Oct. 9, 1996.

[51] Int. Cl.$^6$ ..................................................... B23B 13/12
[52] U.S. Cl. ............................... 82/155; 82/153; 279/156
[58] Field of Search ............................... 82/155, 153, 152, 82/162, 163, 164, 168, 170; 279/156; 7/138

[56] References Cited

U.S. PATENT DOCUMENTS

| | | | |
|---|---|---|---|
| 549,250 | 11/1895 | Owen | 82/152 |
| 1,447,947 | 3/1923 | Grimont et al. | 7/138 |
| 1,677,473 | 7/1928 | Gast | 7/138 |
| 2,676,810 | 4/1954 | Landreth | 82/155 X |
| 2,756,059 | 7/1956 | Knapp | 279/156 |
| 3,385,607 | 5/1968 | Hughes | 82/155 X |
| 5,251,918 | 10/1993 | Morgan | 82/155 X |
| 5,553,340 | 9/1996 | Brown, Jr. | 7/138 X |

OTHER PUBLICATIONS

P. 2134 from Manhatten Supply Company Catalog 97/98.

*Primary Examiner*—Andrea L. Pitts
*Assistant Examiner*—Henry W. H. Tsai
*Attorney, Agent, or Firm*—Leatherwood Walker Todd & Mann, P.C.

[57] ABSTRACT

A reference stop for use in a lathe having a movable chuck and a draw tube adjacent to the chuck. A movable backstop is provided for rectilinear movement within a sleeve. The sleeve is inserted through the chuck of the lathe and extends into the draw tube. A threaded rod is attached to the backstop and extends outwardly from the sleeve, into the draw tube, and in a direction away from the chuck. The threaded rod is turned by a wrench and driver combination, and turning of the threaded rod causes corresponding rectilinear movement of the backstop in the sleeve, thereby allowing for a workpiece reference stop which is adjustable with respect to the chuck.

10 Claims, 7 Drawing Sheets

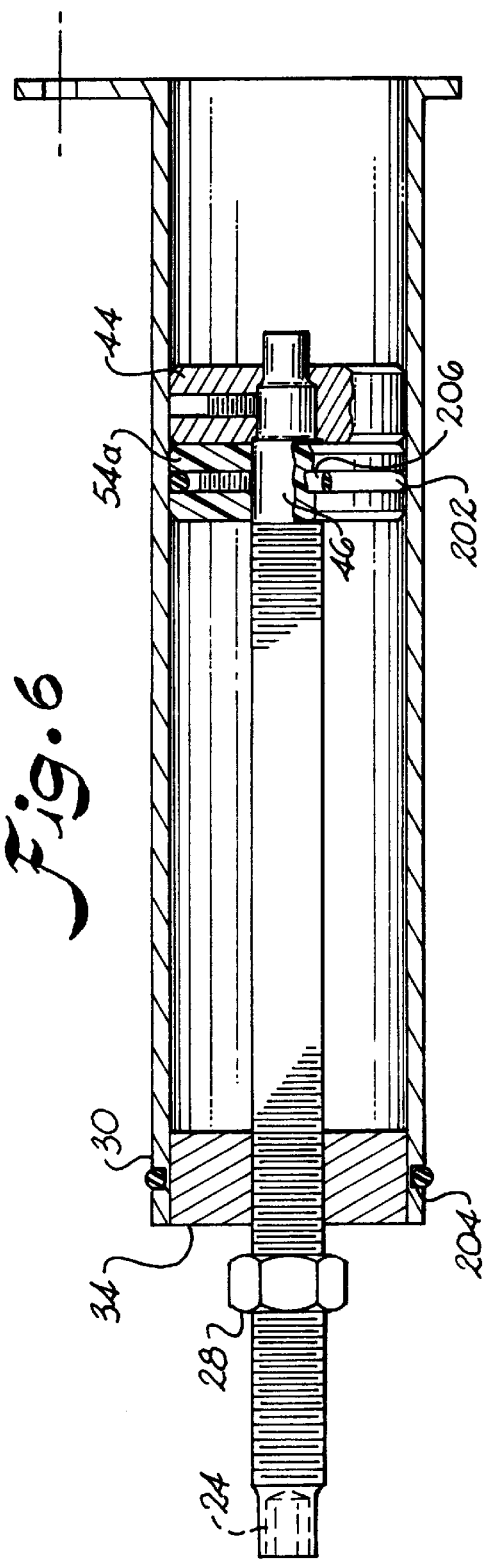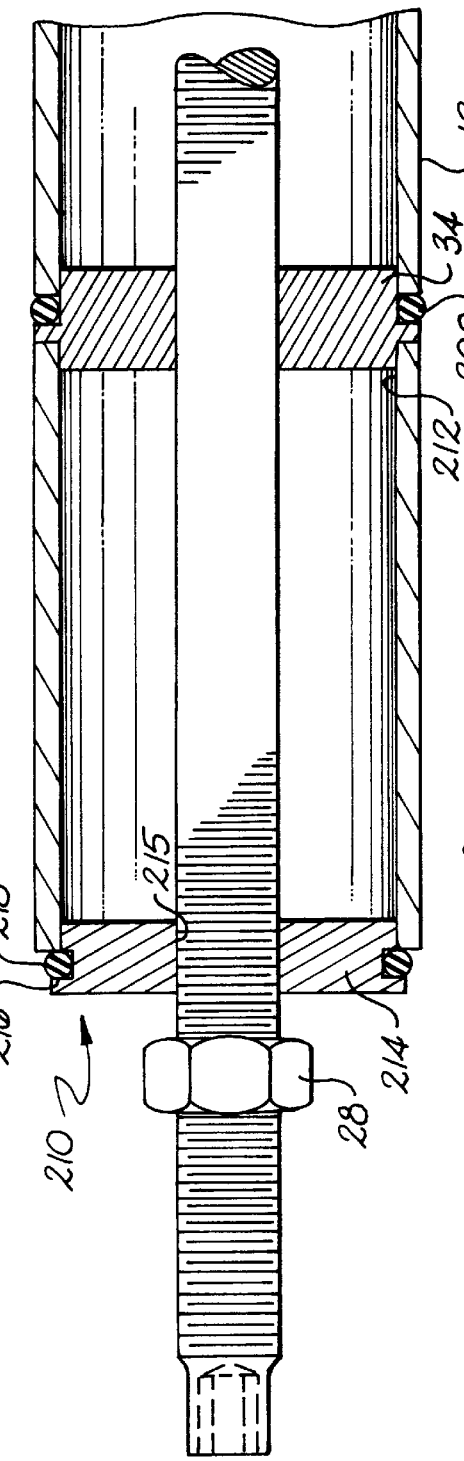

LATHE REFERENCE STOP AND COMBINATION TOOL

This application claims benefit of U.S. Provisional Application Serial No. 60/028,247, filed Oct. 9, 1996, entitled "Lathe Reference Stop And Combination Tool."

BACKGROUND OF THE INVENTION

This invention relates generally to a reference stop for use in a lathe for providing a fixed surface from which measurements can be made for applying tools to a workpiece being worked in the lathe.

Lathes are typically provided with a chuck which is used to grip raw stock to be worked, and means for rotating the chuck at a high rate of speed, which can approach thousands of revolutions per minute ("RPM"). A draw tube may be connected to the chuck for rotation with the chuck. Raw stock passes through the draw tube and is engaged by the chuck during operation of the lathe.

Typically, raw stock is inserted through one end of the machine through the draw tube, and then on through the chuck, where the stock is gripped. However, although the workstock is typically inserted into the backside of the chuck through the draw tube, in certain operations it is necessary to insert the stock directly into the front side of the chuck and on into the draw tube. This is necessary when the stock must be worked at a particular point along its length, and that length dimension, as measured from the end of the stock now within the draw tube, must be accurately measured. A common method of measuring this point is through a simple trial and error approach. The stock is repeatedly inserted through the front end of the chuck into the draw tube and tightened down, and measurements taken until the correct distance from the free end of the workstock to the working point of the lathe tool to be used is found. This can be a tedious, cumbersome, and time-consuming endeavor and reduces the efficiency of operation of the lathe, and further, increases labor costs associated with production. Other means have included devices for attachment of a reference stop to the draw tube. However, because in conventional lathes the draw tube moves rearwardly during the tightening of jaws of the chuck when gripping the stock, and forwardly to loosen the chuck jaws, such reference stops can become difficult to adjust to the proper reference distance.

Accordingly, there exists a need for a means for facilitating setup of stock within a chuck to present a predetermined point of the stock to a desired lathe tool.

SUMMARY OF THE INVENTION

It is, therefore, the principal object of this invention to provide a lathe reference stop for use in positioning workstock in a desired location.

Still another object of the present invention is to provide a lathe reference stop which can readily be used on a conventional lathe.

Another object of the present invention is to provide a combination tool for use in connection with a lathe reference stop constructed in accordance with the present invention.

Yet another object of the present invention is to provide a lathe reference stop and combination tool which are usable in conjunction with one another on a conventional lathe.

Generally, the present invention includes a backstop to be used in a lathe when a piece of workstock must be worked at a predetermined distance from a reference end of the stock. The backstop is adjustable and is provided with a stop tube, the stop tube having a flange which fixedly connects the stop tube to a conventional chuck on the lathe. A threaded shaft adjustment is attached to the backstop for moving the backstop within the sleeve, and the threaded shaft includes a profiled end.

The present invention also includes a tool for insertion into the open end of the draw tube of the lathe. The tool includes a cooperating socket member for engaging the profiled end of the threaded rod. This allows for the threaded rod to be turned to adjust the backstop, while the backstop is installed within the lathe, to therefore move the backstop to a desired reference distance from the chuck.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 6 is a sectional view of an alternate embodiment lathe reference stop constructed in accordance with the present invention;

FIG. 7 is a partial sectional view of an extension which can be added to a lathe reference stop constructed in accordance with the present invention.

DESCRIPTION OF THE PREFERRED EMBODIMENT

Figure 1:
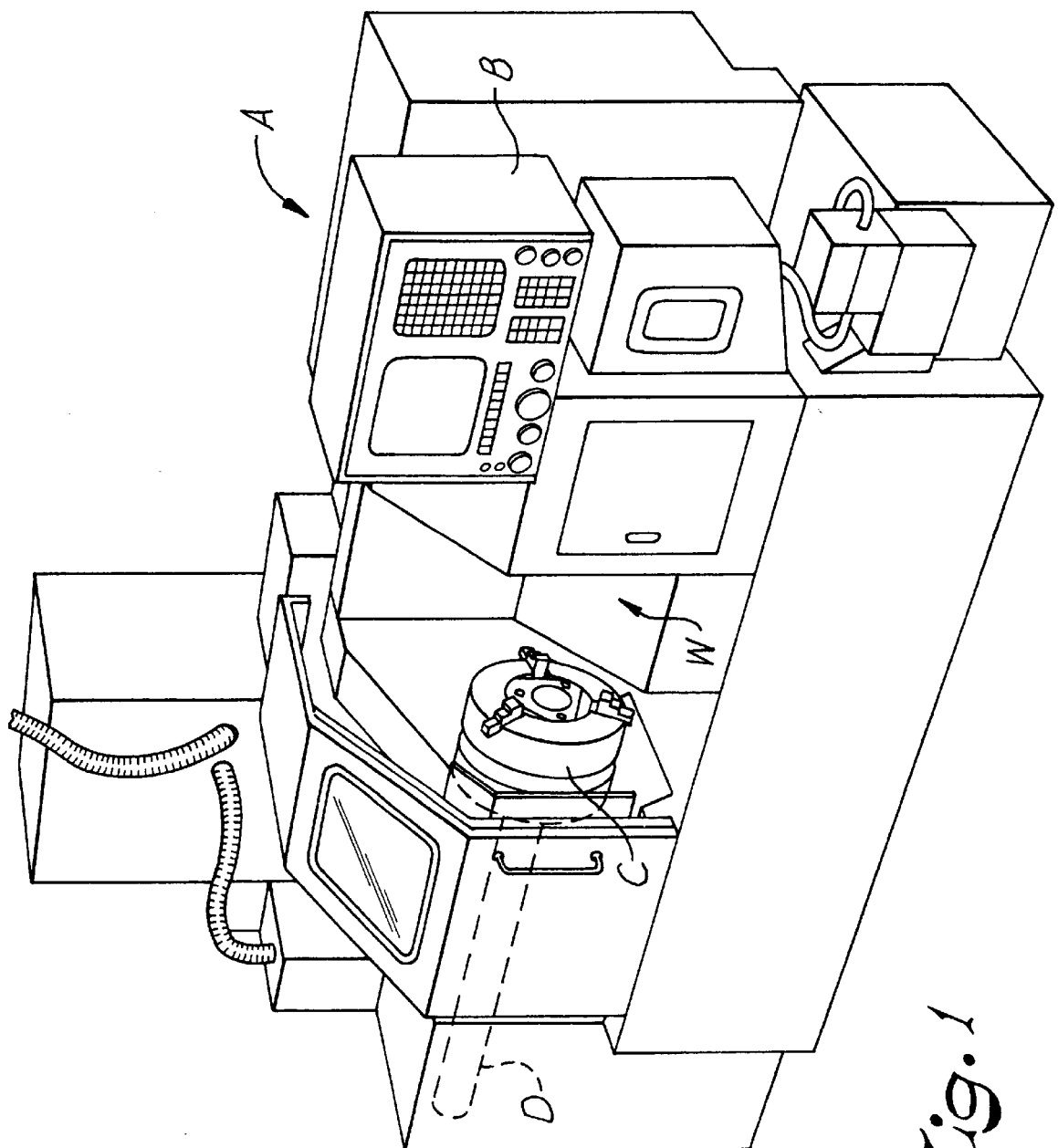
FIG. 1 is a perspective view of a conventional lathe.

The accompanying drawings and the description which follows set forth this invention in its preferred embodiment. However, it is contemplated that persons generally familiar with lathes and lathe tools will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the lathe reference stop and combination tool of the present invention are indicated generally in the figures by reference characters 10 and 100, respectively.

Turning to FIG. 1, a lathe A is illustrated having an operator interface B and a chuck C. Extending rearwardly from chuck C is a draw tube D which terminates at its other end at the open end E of lathe A, into which raw stock S is generally inserted for production purposes. A tool work area W is provided in front of chuck C.

Figure 2:
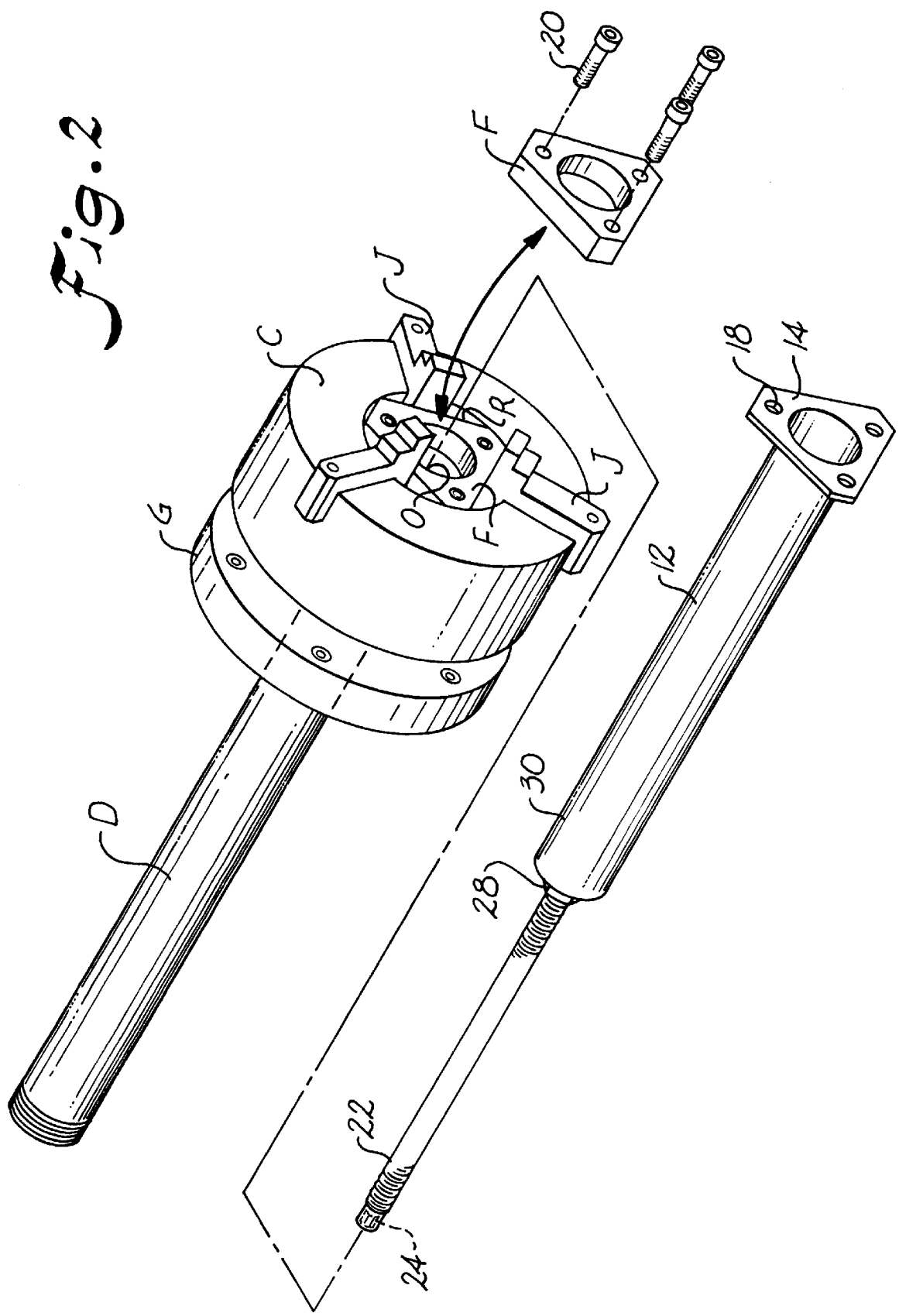
FIG. 2 is an exploded view of a lathe reference stop constructed in accordance with the present invention.

FIG. 2 illustrates the lathe reference stop 10 constructed in accordance with the present invention. The reference stop device 10 is inserted through opening O of chuck C, and includes a sleeve 12 to which a flange 14 is welded or attached by fasteners. Flange 14 includes bolt holes 18 through which bolts 20 pass for attaching flange 14 within a recess R of chuck C. When this is done, the conventional flange F provided with chuck C is removed, and sleeve 12 and flange 14 inserted in its place. Flange F is replaced on top of flange 14, after stop device 10 is inserted in draw tube D. Extending rearwardly from chuck C is draw tube D, which is mounted to chuck C, having flange G.

Figure 3:
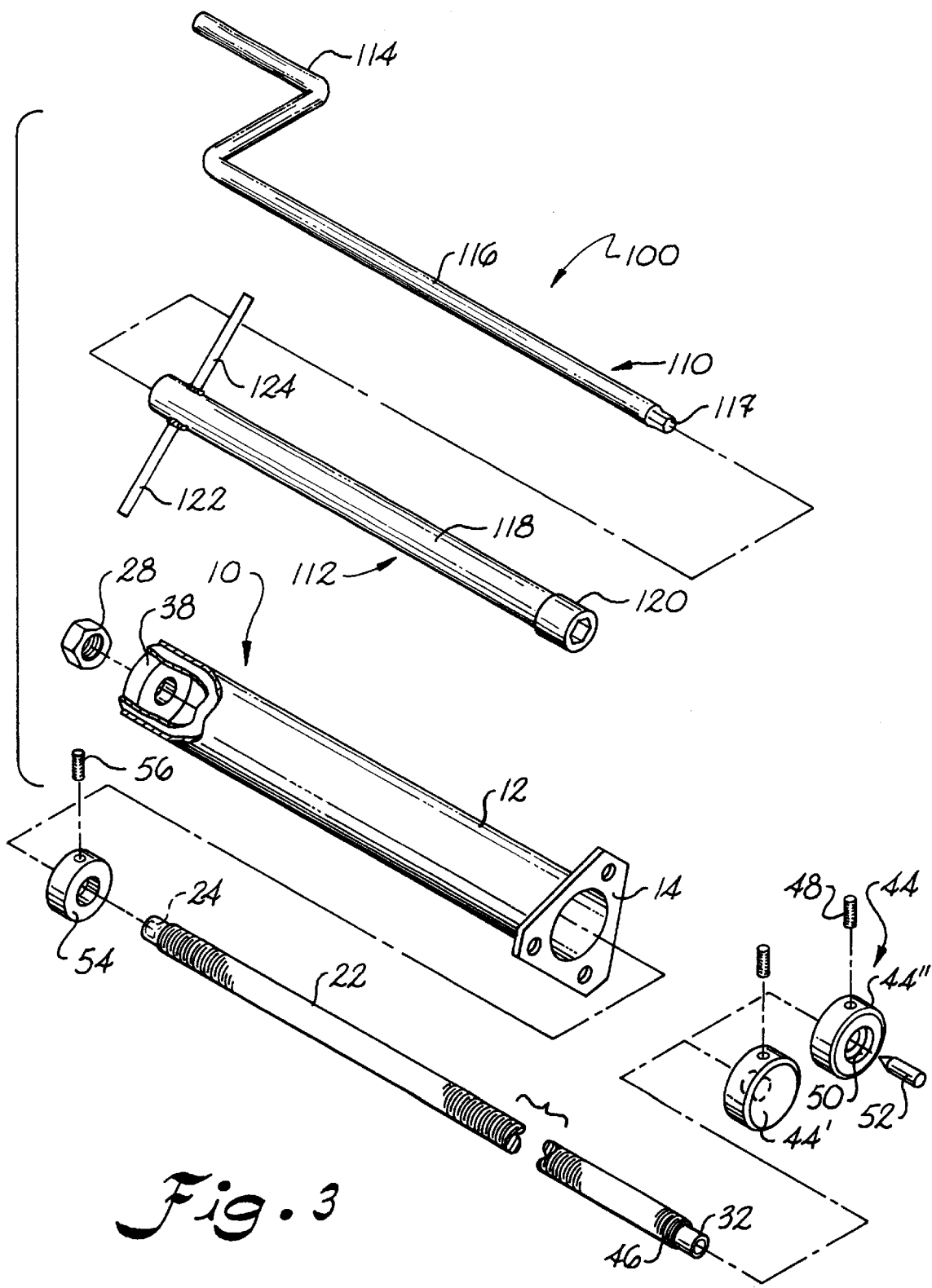
FIG. 3 is an exploded view, with parts cut away, of a lathe reference stop and combination tool constructed in accordance with the present invention.
Figure 4:
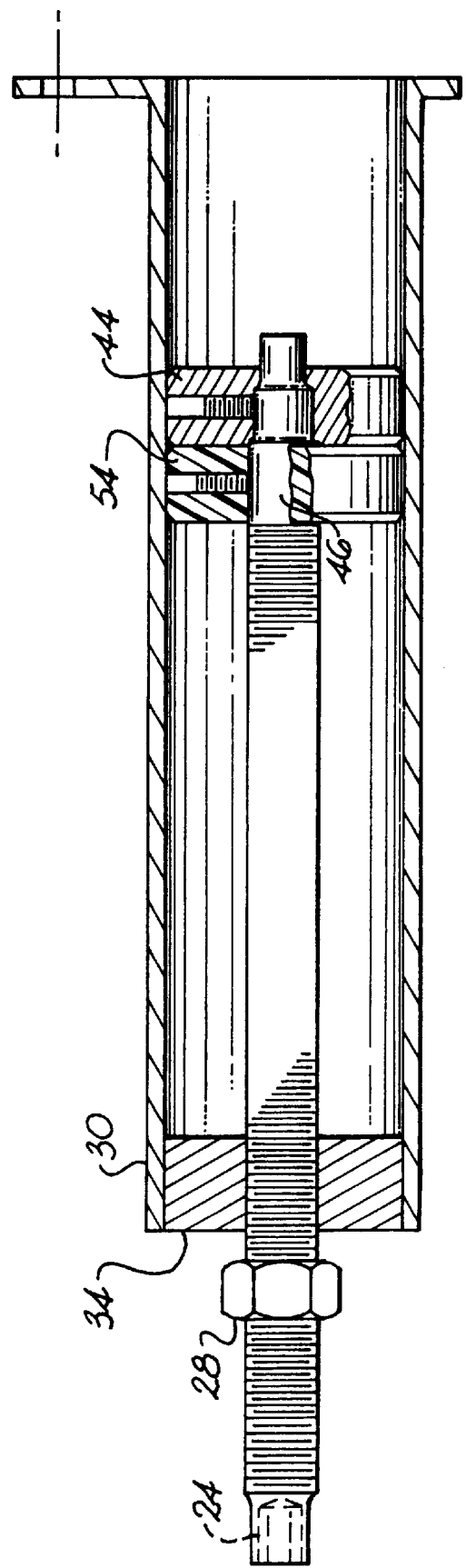
FIG. 4 is a sectional view of a lathe reference stop constructed in accordance with the present invention.

A threaded rod 22, having a profiled end 24, is provided on which jam nut 28 is threadingly connected. Jam nut 28 selectively fixes rotation of threaded rod 22 with respect to sleeve 12 (as shown in FIGS. 3 and 4). To advance threaded rod 32 inwardly or outwardly with respect to sleeve 12, threaded rod 22 is selectively rotated using profiled end 24. It is to be understood that while flange 14 is illustrated as being generally triangular in shape, it could be a variety of other shapes, as desired, in order to be fitted within a particular chuck C of a lathe A.

Provided within end 30 of sleeve 12 is threaded plate 34 which is fixedly connected within the interior of sleeve 12, as shown in FIGS. 3 and 4. Plate 34 can be fixed to sleeve 12 via welding, or through use of a set screw (not shown), or could be formed integrally with sleeve 12, if desired. Additionally, a threaded boss 38 can be provided, as shown in FIG. 3, in the end 30 of sleeve 12, if desired.

End 32 of threaded rod 22 is provided with a backstop, generally 44. As shown in FIG. 3, backstop 44 is a member which is fixed to threaded rod end portion 46 by a set screw 48. Backstop 44 can have a flat surface as illustrated by backstop 44', or could have a cylindrical recess 50 as illustrated with backstop 44". Further, a male stop, or alocator pin, generally 52, can be provided for use in connection with hollow workstock. Locator pin 52 can be fixed within recess 50 by any suitable means, including a set screw (not shown).

Figure 5:
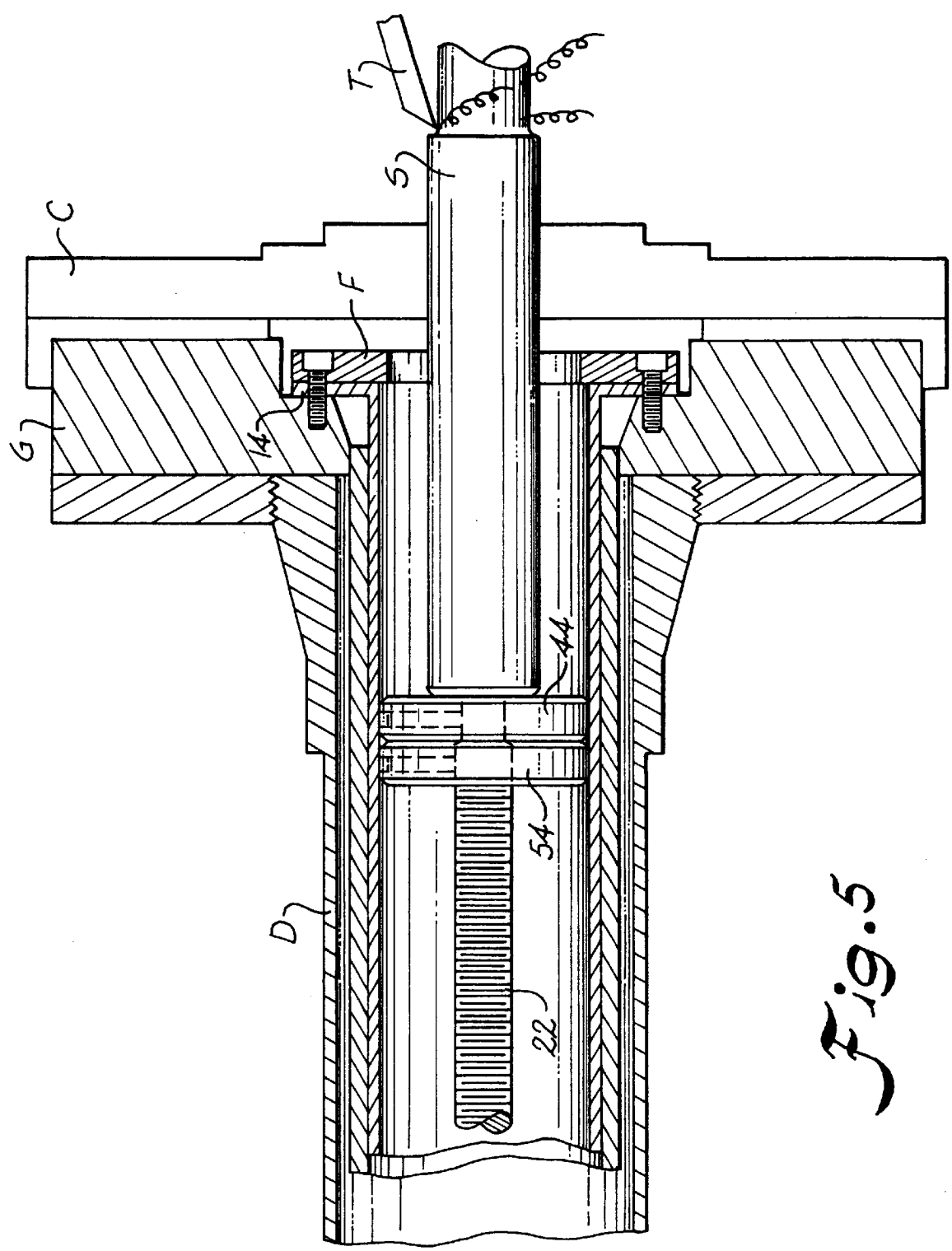
FIG. 5 is a partial sectional view of a lathe reference stop constructed in accordance with the present invention, installed in a lathe.

FIG. 5 illustrates reference stop device 10 inserted within a draw tube D of a lathe. Bushing 54, preferably attached to threaded rod 22, for example with a set screw 56, near end 46 supports end 46 within sleeve 12. Bushing 54 and backstops 44 are preferably constructed of a hard smooth material, such as nylon, metal, plastic, wood, etc.

Profiled end 24 of rod 22 is internally profiled, for example in an Allen socket manner, for receipt of an Allen-type end of the combination tool, generally 100, constructed in accordance with the present invention, shown in FIG. 3.

Combination tool 100 includes a crank member, generally 110, and a wrench member, generally 112. Crank member 110 includes a handle portion 114, and offset therefrom, an elongated shaft member 116. Shaft member 116 terminates in an Allen wrench-type head 117 for insertion into the Allen-type socket of profiled end 24 of rod 22. Although an Allen-type arrangement is illustrated for profiled end 24 of rod 22 and head 117 of wrench 112, other cooperating configurations could also be used, such as Torx, Phillips, slotted, or some other configuration or variation thereof. Profiled end 24 could also be a male connection, and head 117 a female connection.

Wrench 112 includes an elongated tube member 118 which terminates in a socket member 120. Socket member 120 is adapted to engage jam nut 28. Wrench member 112 also includes transverse handles 122, 124 for engagement by an operator during use, as described below.

Figure 8:
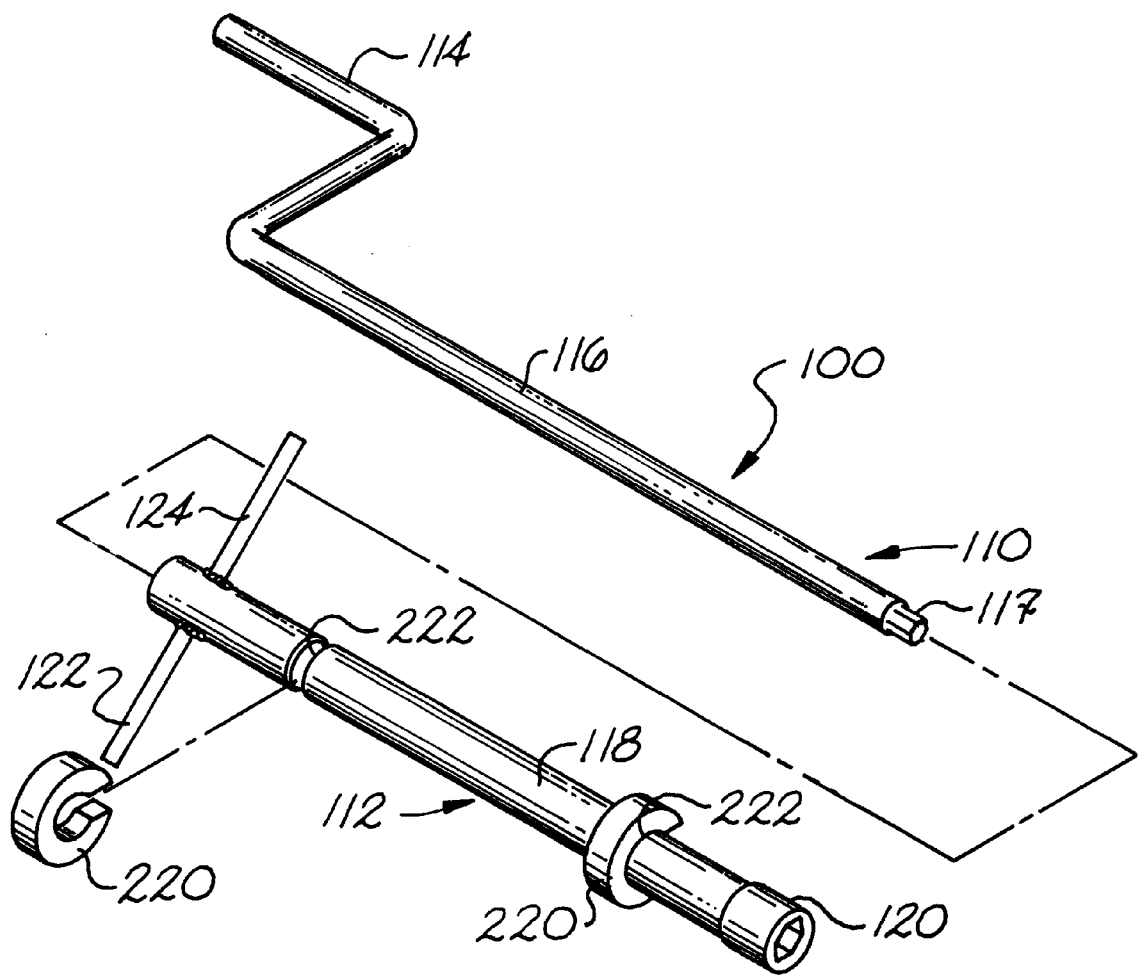
FIG. 8 is an exploded view of an alternate embodiment of a combination tool constructed in accordance with the present invention.

Variations of the present invention are illustrated as alternate embodiments in FIGS. 6 through 8. In FIG. 6, O-rings 200 and 202 are provided. O-ring 200 is seated in a groove 204, provided about the circumference of the end of sleeve 12 opposite flange 14. The O-rings 200, 202 are preferably made from rubber, plastic, or some other elastomeric material. O-ring 200 engages with the inner surface of draw tube D to add further support of sleeve 12 in draw tube D.

O-ring 202 is provided in a circumferential groove 206 in bushing 54a. O-ring 202 serves to support and stabilize bushing 54a within sleeve 12 during operation.

A sleeve extension, generally 210 may also be provided. Sleeve extension 210 is of substantially the same diameter as sleeve 12 and includes an opened end 212 for receiving plate 34 of sleeve 12. Sleeve extension 210 includes an end plate 214 having a bore 215 therethrough for receipt of threaded rod 22. Jam nut 28 is used to bear against end plate 214 to force sleeve extension 210 against the end of sleeve 212 to thereby retain sleeve 210 in position.

Plate 214 may also include a circumferential groove 216 which carries an O-ring 218. O-ring 218 performs the same function as O-ring 200 (discussed in regards to the embodiment of FIG. 6) to support the terminal end of sleeve extension 210 against sleeve 12 within draw tube D.

The purpose of sleeve 210 is to support threaded rod 22 in the event threaded rod 22 extends a significant distance outwardly from the end of sleeve 12. Because threaded rod 22 and sleeve 12 rotate with the chuck at a high rate of speed, sleeve 210, by supporting that portion of threaded rod 22 extending outwardly beyond plate 34, keeps the end of threaded rod 22 from orbiting or whirling around within draw tube D.

FIG. 8 illustrates the use of C-shaped centering bushings 220 for use with wrench 112. Annular grooves 222 are provided in the wall of wrench 112 such that bushings 220 seat therein. Bushings 220 could be of a variety of designs, but are preferably constructed of nylon, plastic, or some other suitable material and are C-shaped. The C-shape allows for the bushings 220 to be spread apart sufficiently to be inserted in grooves 222, but are resilient enough such that bushings 220 remain seated in grooves 222 once placed therein.

Bushings 220 serve to center and support wrench 112 as it is inserted in draw tube D. This aids the operator in using wrench 112, and bushings 220 also serve to help the operator locate socket 120 on jam nut 28. The bushings 220 are sized such that wrench 112 may be easily inserted and rotated within draw tube D, while still offering sufficient support to substantially center wrench 112 within the draw tube.

In use, when a reference stop is desired for a workpiece S, flange F of chuck C is removed, and sleeve 12 of reference stop 10 is inserted in opening O of chuck C. Flange 14 of stop 10 is then bolted to chuck C with bolts 20, and flange F replaced. The backstop 44 within sleeve 12 is then adjusted to the proper reference distance by turning threaded rod 22, using a ruler, scale, or other similar measuring device (not shown) which is inserted through opening O of chuck C and which contacts the reference stop. Threaded rod 22 is rotated by crank 110, which has first been inserted through wrench 112. Once backstop 44 is at the desired location as a reference for the workpiece, crank 110 is held stationary while wrench 112 is used to tighten jam nut 28 against end 30 of sleeve 12. This fixes rod 22 against further movement in or out of sleeve 12. Reference stop device 10 is then ready for use.

Removal of reference stop device 10 is accomplished in reverse order as was installation, except, that it is not necessary to use crank 110 and wrench 112 to remove reference stop 10 from lathe A, only flange 14 need be unbolted.

From the foregoing, it can be seen that the present invention provides a reference stop which can be easily inserted into a conventional lathe such as a computer numerical controlled ("CNC") lathe and which can be readily adjusted to provide a reference stop of desired depth for use of a tool T on a workpiece. Further, the present invention provides a combination tool which allows the backstop 44 within reference stop device 10 to be adjusted from outside of lathe A, without removing device 10 from lathe A.

Significantly, because reference stop device 10 is attached to chuck C, as jaws J of chuck C move radially inwardly during tightening against the workpiece S, the reference stop 10, and accordingly backstop 44 remains stationary with respect to jaws J. Therefore, the workpiece reference distance between backstop 44 and chuck C remains constant, even during tightening and loosening of chuck C. While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

What is claimed is:

1. A reference stop for use in locating work stock in a lathe having a movable chuck, the reference stop comprising:
   a sleeve defining a longitudinal passage, said sleeve having a first end and a second end opposite said first end, and said first end of said sleeve being adapted for attachment to the chuck for movement therewith;
   a backstop carried for movement in said longitudinal passage;
   a threaded rod connected to said backstop and threadingly connected to said sleeve for rotation relative to said sleeve, such that rotation of said threaded rod moves said backstop substantially rectilinearly with respect to said first end of said sleeve;
   a threaded jam nut threadingly engaged with and rectilinearly movable with respect to said threaded rod carried adjacent to said second end of said sleeve for selectively fixing rotation of said threaded rod with respect to said sleeve; and
   said threaded rod having a first end and a second end opposite said first and, said first end being connected to said backstop, and said second end being a free end extending outwardly through said second end of said sleeve, such that said backstop may be selectively adjusted while in the lathe by rotating said second end of said threaded rod, and fixed against movement by said threaded jam nut.

2. A reference stop as defined in claim 1, wherein said second end of said sleeve is substantially closed and includes a threaded bore for receiving said threaded rod.

3. A reference stop as defined in claim 1, wherein said sleeve is cylindrical and said backstop is disk-shaped.

4. A reference stop as defined in claim 1, wherein said first end of said sleeve is substantially open and said second end of said sleeve includes a threaded bore, and wherein said threaded rod threadingly engages said threaded bore.

5. A reference stop as defined in claim 1, wherein said first end of said sleeve includes an outwardly extended flange adapted for attachment to the chuck of the lathe.

6. A reference stop as defined in claim 2, further comprising an elongated wrench for turning said jam nut.

7. A reference stop as defined in claim 2, wherein said second end of said threaded rod defines an engagement profile.

8. A reference stop as defined in claim 7, further including a driver adapted to engage said engagement profile of said second end of said threaded rod.

9. A reference stop as defined in claim 8, further comprising an elongated wrench for turning said jam nut, and wherein said elongated wrench defines a passage for receipt of said driver, said driver and said elongated wrench being adapted to allow simultaneous engagement of said wrench with said jam nut and engagement of said driver with said engagement profile of said threaded rod for allowing adjustment with said threaded rod.

10. A reference stop as defined in claim 1, wherein said first end of said sleeve is substantially open and said second end of said sleeve includes a first threaded bore, and wherein said threaded rod threadingly engages said threaded bore; and further comprising an extension sleeve connected to said second end of said sleeve for receiving said threaded rod, said extension sleeve having a second threaded bore for threading receipt of said threaded rod.

* * * * *